US012647834B2

(12) United States Patent
Vadapalli et al.

(10) Patent No.: US 12,647,834 B2
(45) Date of Patent: Jun. 2, 2026

(54) BANDWIDTH PART SWITCHING BASED ON REFERENCE SIGNAL DECODING

(71) Applicant: QUALCOMM Incorporated, San Diego, CA (US)

(72) Inventors: Syam Pavan Vadapalli, Visakhapatnam (IN); Baya Reddy L N, Kadapa (IN); Parshu Ramulu Chintakindi, Hyderabad (IN); Roop Sagar Inakollu, San Diego, CA (US); Ankammarao Ravuvari, Hyderabad (IN); Rasul Mastan Mahammad, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 18/402,095

(22) Filed: Jan. 2, 2024

(65) Prior Publication Data

US 2025/0220511 A1    Jul. 3, 2025

(51) Int. Cl.
H04W 28/20        (2009.01)
H04L 5/00          (2006.01)
H04W 72/12        (2023.01)

(52) U.S. Cl.
CPC ........... H04W 28/20 (2013.01); H04L 5/0048 (2013.01); H04W 72/12 (2013.01)

(58) Field of Classification Search
CPC ...... H04W 28/20; H04W 72/12; H04L 5/0048
See application file for complete search history.

(56) References Cited

U.S. PATENT DOCUMENTS

| | | | |
|---|---|---|---|
| 2020/0170063 A1 | 5/2020 | Hu et al. |
| 2022/0256565 A1 | 8/2022 | Inakollu et al. |
| 2023/0328742 A1 | 10/2023 | Vadapalli et al. |

OTHER PUBLICATIONS

International Search Report and Written Opinion—PCT/US2024/054453—ISA/EPO—Feb. 7, 2025 (2308518WO).

*Primary Examiner* — Justin Y Lee

(74) *Attorney, Agent, or Firm* — Holland & Hart LLP

(57)                    ABSTRACT

Methods, systems, and devices for wireless communication are described. A network entity may configure a user equipment (UE) supporting multiple subscriptions with a set of bandwidth parts (BWPs), where a first BWP may be active. The UE may detect a shadowing event or a tune-away gap associated with the first BWP. Subsequently, the UE may identify a decline in a scheduling rate or channel conditions associated with the first BWP. The UE may no longer receive downlink control information (DCI) from the network entity during the shadowing event or the tune-away gap, and thus may be unaware of a BWP switch command from the network entity. Accordingly, the UE may decode a reference signal on a second BWP to determine whether the second BWP is active (therefore indicating that the network entity did command a BWP switch). The UE may switch and monitor the second BWP for a scheduling message.

20 Claims, 10 Drawing Sheets

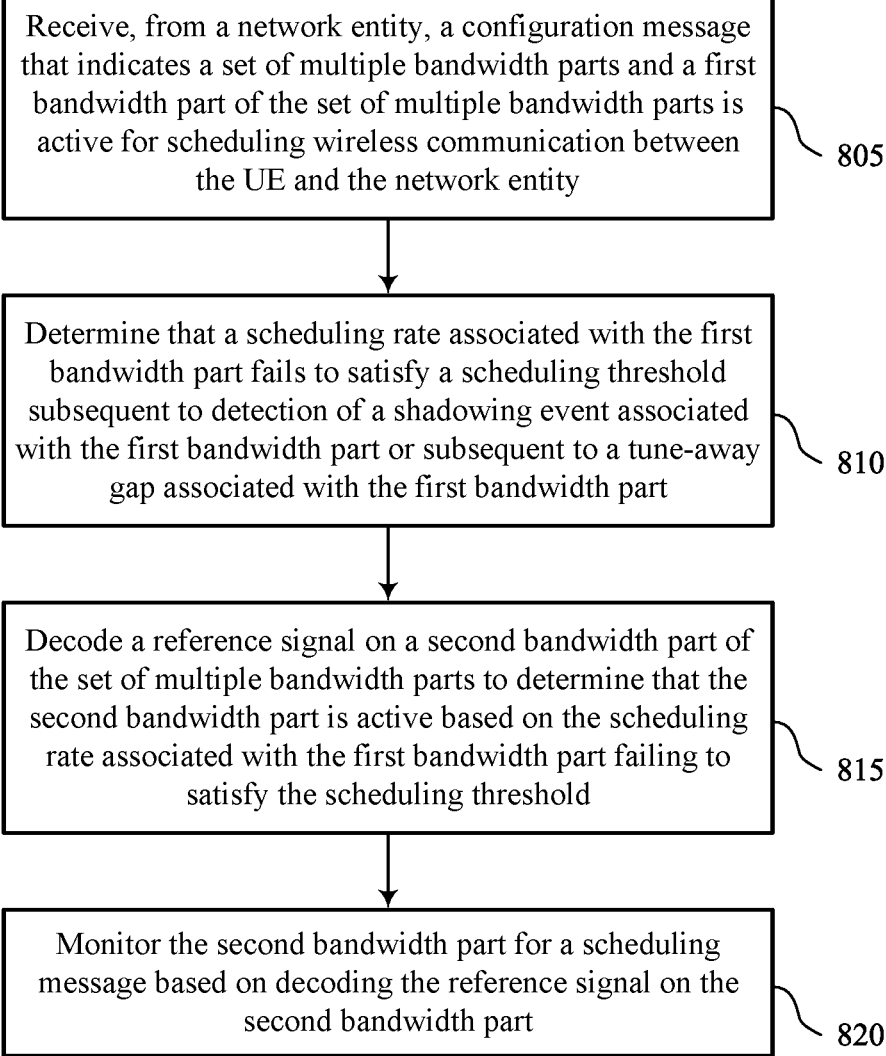

Receive, from a network entity, a configuration message that indicates a set of multiple bandwidth parts and a first bandwidth part of the set of multiple bandwidth parts is active for scheduling wireless communication between the UE and the network entity

805

Determine that a scheduling rate associated with the first bandwidth part fails to satisfy a scheduling threshold subsequent to detection of a shadowing event associated with the first bandwidth part or subsequent to a tune-away gap associated with the first bandwidth part

810

Decode a reference signal on a second bandwidth part of the set of multiple bandwidth parts to determine that the second bandwidth part is active based on the scheduling rate associated with the first bandwidth part failing to satisfy the scheduling threshold

815

Monitor the second bandwidth part for a scheduling message based on decoding the reference signal on the second bandwidth part

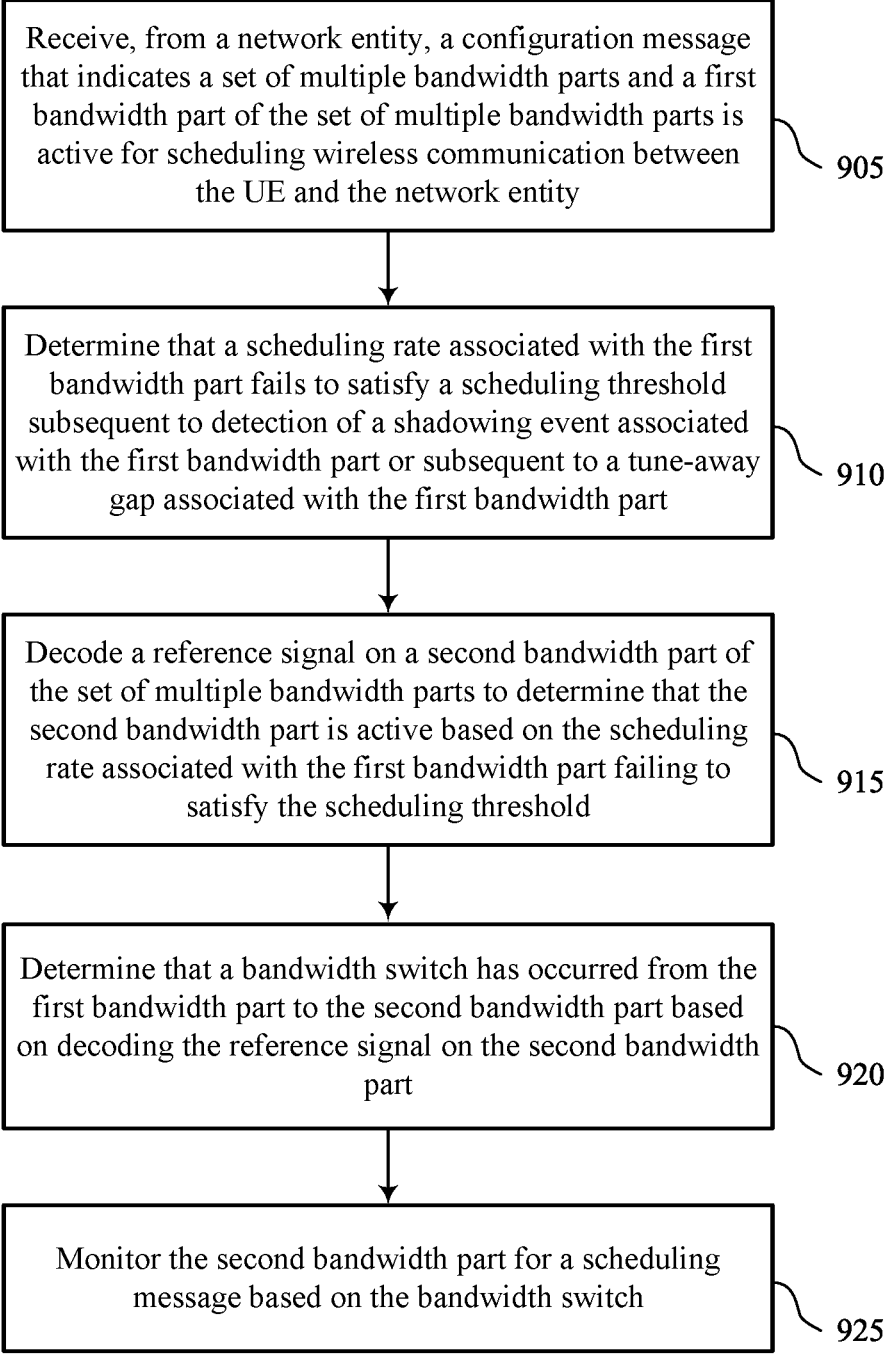

Receive, from a network entity, a configuration message that indicates a set of multiple bandwidth parts and a first bandwidth part of the set of multiple bandwidth parts is active for scheduling wireless communication between the UE and the network entity ⟍ 905

Determine that a scheduling rate associated with the first bandwidth part fails to satisfy a scheduling threshold subsequent to detection of a shadowing event associated with the first bandwidth part or subsequent to a tune-away gap associated with the first bandwidth part ⟍ 910

Decode a reference signal on a second bandwidth part of the set of multiple bandwidth parts to determine that the second bandwidth part is active based on the scheduling rate associated with the first bandwidth part failing to satisfy the scheduling threshold ⟍ 915

Determine that a bandwidth switch has occurred from the first bandwidth part to the second bandwidth part based on decoding the reference signal on the second bandwidth part ⟍ 920

Monitor the second bandwidth part for a scheduling message based on the bandwidth switch ⟍ 925

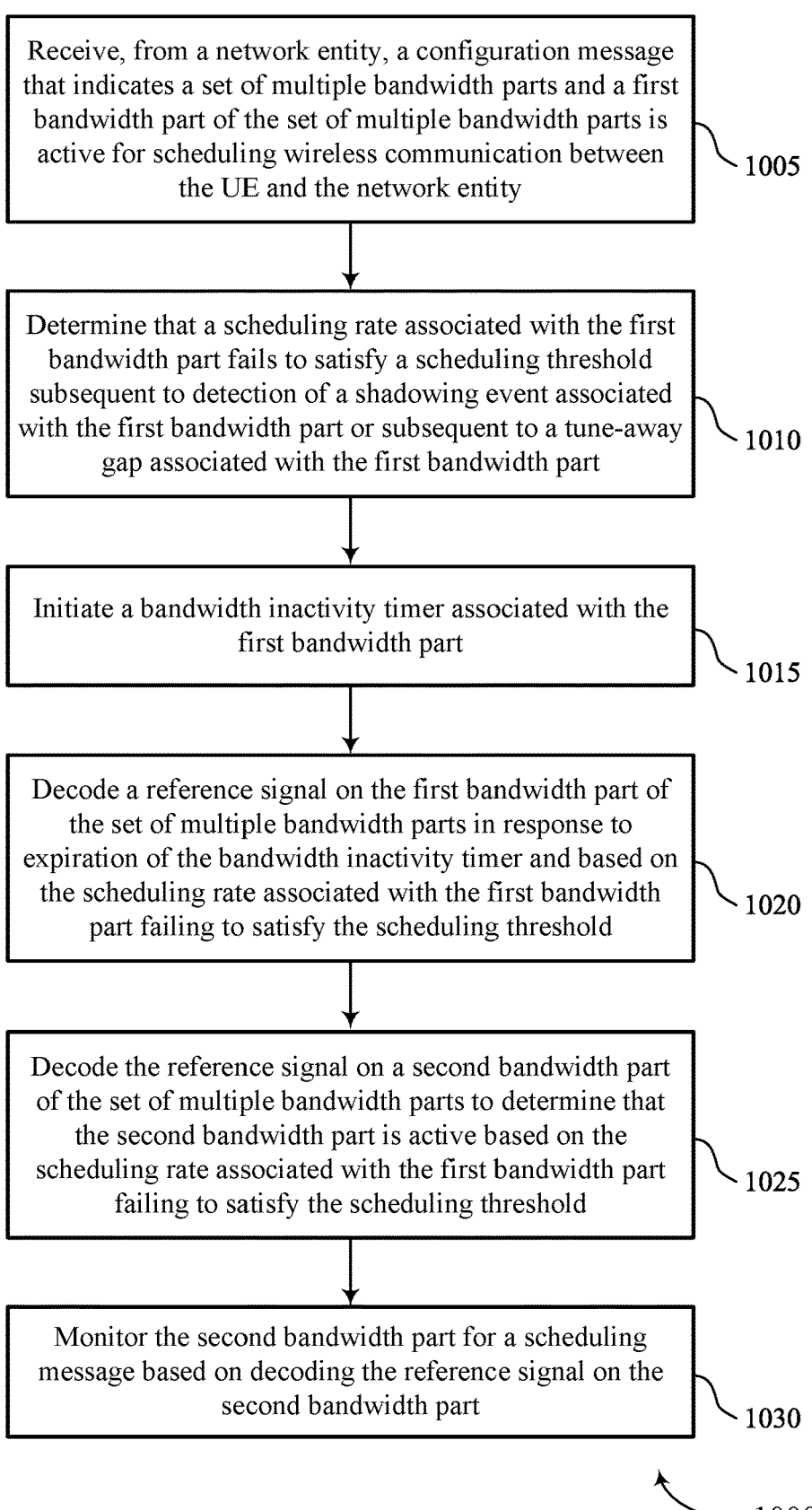

Receive, from a network entity, a configuration message that indicates a set of multiple bandwidth parts and a first bandwidth part of the set of multiple bandwidth parts is active for scheduling wireless communication between the UE and the network entity

1005

Determine that a scheduling rate associated with the first bandwidth part fails to satisfy a scheduling threshold subsequent to detection of a shadowing event associated with the first bandwidth part or subsequent to a tune-away gap associated with the first bandwidth part

1010

Initiate a bandwidth inactivity timer associated with the first bandwidth part

1015

Decode a reference signal on the first bandwidth part of the set of multiple bandwidth parts in response to expiration of the bandwidth inactivity timer and based on the scheduling rate associated with the first bandwidth part failing to satisfy the scheduling threshold

1020

Decode the reference signal on a second bandwidth part of the set of multiple bandwidth parts to determine that the second bandwidth part is active based on the scheduling rate associated with the first bandwidth part failing to satisfy the scheduling threshold

1025

Monitor the second bandwidth part for a scheduling message based on decoding the reference signal on the second bandwidth part

BANDWIDTH PART SWITCHING BASED ON REFERENCE SIGNAL DECODING

FIELD OF TECHNOLOGY

The following relates to wireless communication, including bandwidth part (BWP) switching based on reference signal decoding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support bandwidth part (BWP) switching based on reference signal decoding. For example, the described techniques provide for autonomous BWP switching based on reference signal decoding when a UE supports a multi-subscriber identity module (MSIM) mode. A network entity may transmit control signaling to configure a UE with a set of multiple BWPs for communicating with the network entity. While operating on a first BWP which is active, the UE may determine that a scheduling rate associated with the first BWP has dropped below a threshold, such as after detecting a tune-away gap or a shadowing event. That is, after the tune-away gap has occurred, the UE may have missed a BWP switch indication instructing the UE to change the active BWP to a second BWP, and is not being scheduled on the first BWP because such commands are now being sent on the second BWP, resulting in the scheduling rate on the first BWP dropping below a threshold. Similarly, a shadowing event may occur that reduces the quality of the channel via which the UE may communicate with the network entity, resulting in the UE missing a BWP switch indication instructing the UE to change the active BWP to a second BWP. Because the UE is not being scheduled on the first BWP due to such commands now being sent on the second BWP in accordance with the BWP switch indication, the scheduling rate on the first BWP thereby drops below a threshold. Because the network entity configured the UE with a set of BWPs, the UE may attempt to decode a reference signal (e.g., a tracking reference signal (TRS)) on one or more other BWPs from the set of BWPs to determine which BWP is now currently active, and therefore, available for use by the UE. Based on successfully decoding the reference signal on the second BWP, the UE may switch to the second BWP and monitor the second BWP for a subsequent scheduling message from the network entity.

A method for wireless communications by a user equipment (UE) is described. The method may include receiving, from a network entity, a configuration message that indicates a set of multiple BWPs and a first BWP of the set of multiple BWPs is active for scheduling wireless communication between the UE and the network entity, determining that a scheduling rate associated with the first BWP fails to satisfy a scheduling threshold subsequent to detection of a shadowing event associated with the first BWP or subsequent to a tune-away gap associated with the first BWP, decoding a reference signal on a second BWP of the set of multiple BWPs to determine that the second BWP is active based on the scheduling rate associated with the first BWP failing to satisfy the scheduling threshold, and monitoring the second BWP for a scheduling message based on decoding the reference signal on the second BWP.

A UE for wireless communications is described. The UE may include one or more memories storing processor executable code, and one or more processors coupled with the one or more memories. The one or more processors may individually or collectively operable to execute the code to cause the UE to receive, from a network entity, a configuration message that indicates a set of multiple BWPs and a first BWP of the set of multiple BWPs is active for scheduling wireless communication between the UE and the network entity, determine that a scheduling rate associated with the first BWP fails to satisfy a scheduling threshold subsequent to detection of a shadowing event associated with the first BWP or subsequent to a tune-away gap associated with the first BWP, decode a reference signal on a second BWP of the set of multiple BWPs to determine that the second BWP is active based on the scheduling rate associated with the first BWP failing to satisfy the scheduling threshold, and monitor the second BWP for a scheduling message based on decoding the reference signal on the second BWP.

Another UE for wireless communications is described. The UE may include means for receiving, from a network entity, a configuration message that indicates a set of multiple BWPs and a first BWP of the set of multiple BWPs is active for scheduling wireless communication between the UE and the network entity, means for determining that a scheduling rate associated with the first BWP fails to satisfy a scheduling threshold subsequent to detection of a shadowing event associated with the first BWP or subsequent to a tune-away gap associated with the first BWP, means for decoding a reference signal on a second BWP of the set of multiple BWPs to determine that the second BWP is active based on the scheduling rate associated with the first BWP failing to satisfy the scheduling threshold, and means for monitoring the second BWP for a scheduling message based on decoding the reference signal on the second BWP.

A non-transitory computer-readable medium storing code for wireless communications is described. The code may include instructions executable by one or more processors to receive, from a network entity, a configuration message that indicates a set of multiple BWPs and a first BWP of the set of multiple BWPs is active for scheduling wireless communication between the UE and the network entity, determine that a scheduling rate associated with the first BWP fails to satisfy a scheduling threshold subsequent to detection of a shadowing event associated with the first BWP or subsequent to a tune-away gap associated with the first BWP, decode a reference signal on a second BWP of the set of multiple BWPs to determine that the second BWP is active based on the scheduling rate associated with the first BWP failing to satisfy the scheduling threshold, and monitor the second BWP for a scheduling message based on decoding the reference signal on the second BWP.

Some examples of the method, UEs, and non-transitory computer-readable medium described herein may further include operations, features, means, or instructions for determining that a bandwidth switch may have occurred from the first BWP to the second BWP based on decoding the reference signal on the second BWP, where monitoring the second BWP for the scheduling message may be based on the bandwidth switch.

Some examples of the method, UEs, and non-transitory computer-readable medium described herein may further include operations, features, means, or instructions for monitoring for a control message indicating to switch from the first BWP to the second BWP during the shadowing event or the tune-away gap.

Some examples of the method, UEs, and non-transitory computer-readable medium described herein may further include operations, features, means, or instructions for initiating a bandwidth inactivity timer associated with the first BWP that may be active for scheduling the wireless communication between the UE and the network entity and decoding the reference signal on the first BWP of the set of multiple BWPs in response to expiration of the bandwidth inactivity timer and based on the scheduling rate associated with the first BWP failing to satisfy the scheduling threshold.

In some examples of the method, UEs, and non-transitory computer-readable medium described herein, decoding the reference signal on the second BWP may include operations, features, means, or instructions for determining a quantity of slots after the detection of the shadowing event or the tune-away gap based on the scheduling rate and prior DCI and decoding the reference signal on the second BWP after the quantity of slots.

In some examples of the method, UEs, and non-transitory computer-readable medium described herein, decoding the reference signal may include operations, features, means, or instructions for receiving, from the network entity, a TRS on the second BWP, where the TRS may be configured for the set of multiple BWPs and decoding the TRS on the second BWP to determine that the second BWP may be active.

In some examples of the method, UEs, and non-transitory computer-readable medium described herein, the UE supports MSIM operation and a DDS may be in a connected state when the first BWP may be active.

BRIEF DESCRIPTION OF THE DRAWINGS

FIGS. 8 through 10 show flowcharts illustrating methods that support BWP switching based on reference signal decoding in accordance with one or more aspects of the present disclosure.

DETAILED DESCRIPTION

Figure 1:
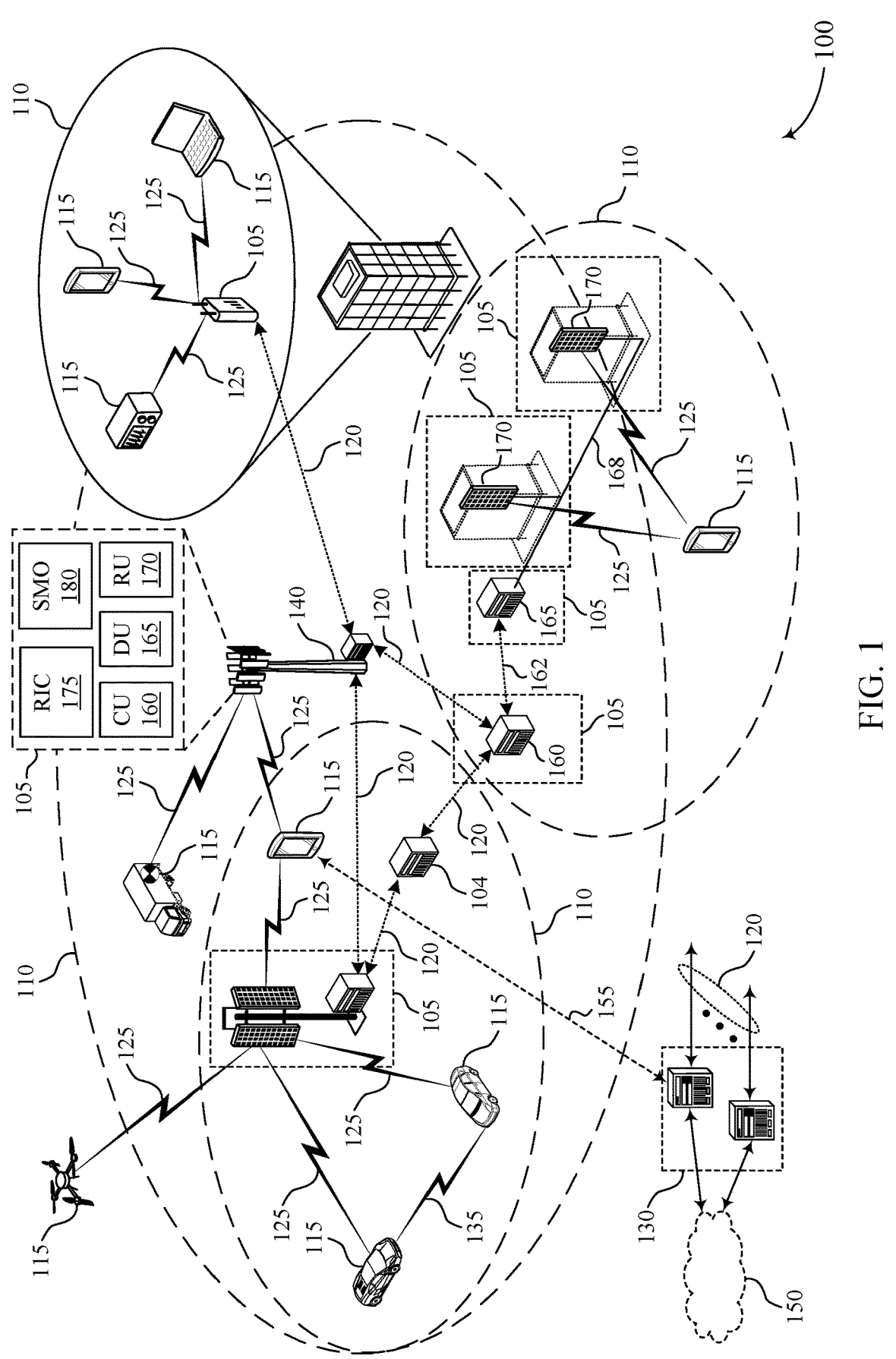
FIG. 1 shows an example of a wireless communications system that supports bandwidth part (BWP) switching based on reference signal decoding in accordance with one or more aspects of the present disclosure.

In some wireless communications systems, a user equipment (UE) may support a multi-subscriber identity module (MSIM) mode including a dedicated data subscription (DDS) and a non-DDS. The UE may operate using the DDS on a particular bandwidth part (BWP) of a channel. In some examples, a tune-away gap may be opened for some activity associated with the non-DDS, where there may be some downlink or uplink activity to be performed by the DDS. The downlink activity may include transmission of downlink control information (DCI) indicating that the UE is to switch to a different BWP. However, if the UE fails to decode the BWP switch indication in the DCI (e.g., if the DCI is communicated during the tune-away gap, a rapid shadowing, or a channel fading event), the UE may fail to switch BWPs in accordance with the BWP switch indication and instead attempt to resume monitoring of the original BWP after the tune-away gap or the shadowing event. As a result, the UE may attempt to decode downlink messages and transmit uplink messages on an incorrect BWP, which may further result in radio link failure, dropped transmissions, and other signaling issues.

The techniques described herein support BWP switching based on reference signal decoding when a UE supports an MSIM mode. A network entity may configure a UE with a set of BWPs for communicating with the network entity. While operating on a first BWP which is active, the UE may determine that a scheduling rate associated with the first BWP drops below a threshold, such as after detecting a tune-away gap or a shadowing event. That is, after the tune-away gap has occurred, the UE may have missed a BWP switch indication instructing the UE to change the active BWP to a second BWP, and is not being scheduled on the first BWP because such commands are now being sent on the second BWP, resulting in the scheduling rate on the first BWP dropping below a threshold. Similarly, a shadowing event may occur that reduces the quality of the channel via which the UE may communicate with the network entity, resulting in the UE missing a BWP switch indication instructing the UE to change the active BWP to a second BWP. Because the UE is not being scheduled on the first BWP due to such commands now being sent on the second BWP in accordance with the BWP switch indication, the scheduling rate on the first BWP thereby drops below a threshold. Because the network entity configured the UE with a set of BWPs, the UE may attempt to decode a reference signal (e.g., a tracking reference signal (TRS)) on one or more other BWPs from the set of BWPs to determine which BWP is now currently active, and therefore, available for use by the UE. Based on successfully decoding the reference signal on the second BWP, the UE may switch to the second BWP and monitor the second BWP for a subsequent scheduling message from the network entity.

Such implementations of the subject matter described in this disclosure also can be implemented to realize one or more of the following improvements. For example, in accordance with supporting autonomous BWP switching by the UE based on decoding reference signals on particular BWPs, the UE and the network entity may improve communication quality between the devices and improve signaling throughput despite tune-away gaps or shadowing events.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to bandwidth part switching based on reference signal decoding.

FIG. 1 shows an example of a wireless communications system 100 that supports BWP switching based on reference signal decoding in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor.

One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support BWP switching based on reference signal decoding as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BWP (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz. The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The wireless communications system may support BWP switching based on reference signal decoding when a UE 115 supports an MSIM mode. A network entity 105 may configure a UE 115 with a set of BWPs for communicating with the network entity 105. While operating on a first BWP which is active, the UE 115 may determine that a scheduling rate associated with the first BWP drops below a threshold, such as after detecting a tune-away gap or a shadowing event. That is, after the tune-away gap has occurred, the UE 115 may have missed a BWP switch indication instructing the UE 115 to change the active BWP to a second BWP, and is not being scheduled on the first BWP because such commands are now being sent on the second BWP, resulting in the scheduling rate on the first BWP dropping below a threshold. Similarly, a shadowing event may occur that reduces the quality of the channel via which the UE 115 may communicate with the network entity 105, resulting in the UE 115 missing a BWP switch indication instructing the UE 115 to change the active BWP to a second BWP. Because the UE 115 is not being scheduled on the first BWP due to such commands now being sent on the second BWP in accordance with the BWP switch indication, the scheduling rate on the first BWP thereby drops below a threshold. Because the network entity configured the UE 115 with a set of BWPs, the UE 115 may attempt to decode a reference signal (e.g., a TRS) on one or more other BWPs from the set of BWPs to determine which BWP is now currently active, and therefore, available for use by the UE 115. Based on successfully decoding the reference signal on the second BWP, the UE 115 may switch to the second BWP and monitor the second BWP for a subsequent scheduling message from the network entity 105.

Figure 2:
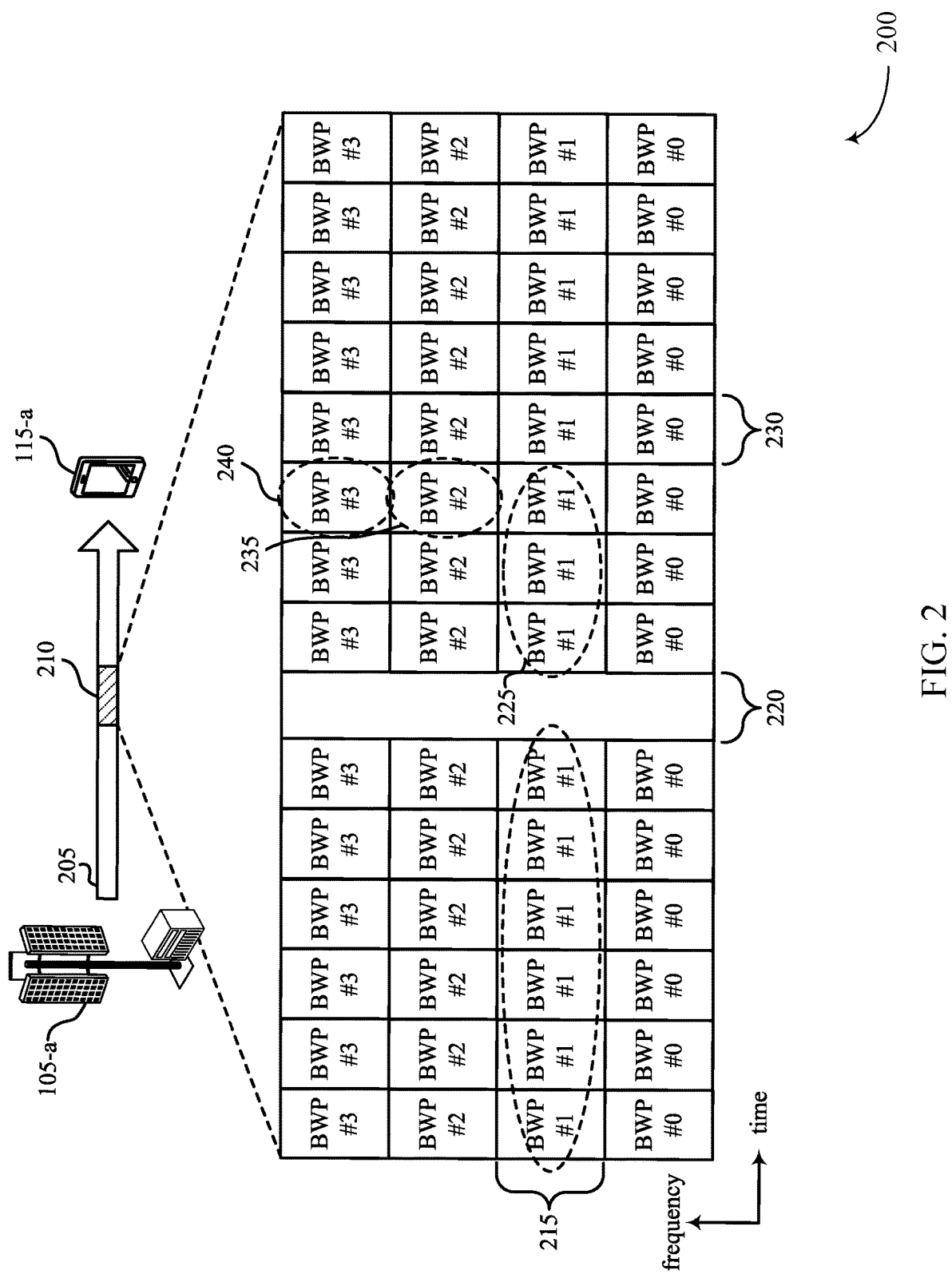
FIG. 2 shows an example of a wireless communications system that supports BWP switching based on reference signal decoding in accordance with one or more aspects of the present disclosure.

FIG. 2 shows an example of a wireless communications system 200 that supports BWP switching based on reference signal decoding in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-a and a network entity 105-a, which may be examples of corresponding devices described herein. The UE 115-a and the network entity 105-a may communicate via a communication link 205 (e.g., a downlink or an uplink), which may be an example of a communication link 125 as described herein with reference to FIG. 1.

The UE 115-a may support an MSIM mode, in which the UE 115-a may support two subscriptions. For example, the UE 115-a may support a DDS (e.g., subscription (Sub) #1) and a non-DDS (e.g., Sub #2). The UE 115-a may perform some functions or communications using the DDS and some others using the non-DDS. In some examples, the UE 115-a may use the DDS for some data activity such as playing a video or browsing a web page. Because of limited resources available to the UE 115-a while operating in an MSIM mode, a tune-away gap may open for some activity (e.g., data decoding) on the non-DDS while the DDS is being used to perform the data activity. That is, the DDS and the non-DDS may share the limited resources for performing different activities. In some examples, the UE 115-a may use the DDS to perform some downlink or uplink activity. Downlink activities may include actions initiated by the network entity 105-a to which the UE 115-a may respond.

For example, a downlink activity may include transmission of DCI (e.g., carried in a physical downlink control channel (PDCCH)).

In some implementations, the network entity 105-a may configure the UE 115-a with multiple BWPs. For example, the network entity 105-a may configure the UE 115-a with up to four BWPs in the downlink and a single BWP as being active in the downlink at any given time. The UE 115-a may not be expected to receive downlink messages (e.g., physical downlink shared channel (PDSCH), PDCCH, or channel state information (CSI) reference signals (CSI-RSs), except for those for radio resource management (RRM)) outside of the active BWP. In addition, the network entity 105-a may indicate that the UE 115-a is to switch from one BWP to another via the DCI. In such cases, the DCI (e.g., DCI_1_1) may include an indication of a BWP switch through a BWP indicator field. For example, the UE 115-a may operate in a first BWP when it receives the DCI including the BWP indicator field, which may indicate that the UE 115-a is to switch to a second BWP. In response, the UE 115-a may switch from the first BWP to the second BWP and perform its downlink and uplink activities accordingly.

However, in some cases, the UE 115-a may fail to decode the DCI (including the BWP switch indication) and as a result may not switch to the second BWP. The UE 115-a may fail to decode the DCI if, the UE 115-a receives the DCI during a tune-away gap or if the UE 115-a undergoes a rapid shadowing event (e.g., where the wireless communication channel is bad). For example, the UE 115-a may tune from a first frequency band to a second frequency band to perform measurements of the second frequency band using the nDDS. Thus, the UE 115-a may be unable to receive and decode DCI on the first frequency band using the DDS at the same time. Alternatively, a shadowing event may result in a significant change in RF channel conditions, thus limiting the UE's ability to decode the DCI. If the UE 115-a is unable to decode the DCI, the UE 115-a may be completely unaware of the instruction by the network entity 105-a to tune to the second BWP and the UE 115-a may continue to operate on the first BWP (e.g., the BWP originally configured) after the tune-away gap or the shadowing event. As a result, the UE 115-a may continue to operate, decode downlink messages, and transmit uplink messages on an incorrect BWP, which may result in further delays, RLC throttling, and eventually RLC RESET or radio link failure.

To prevent such scenarios where the UE 115-a is unable to decode DCI because of a tune-away gap or a shadowing event, the wireless communications system 200 may support techniques that enable the UE 115-a to determine if a BWP switch has occurred and to switch to a target BWP after a tune-away gap or a shadowing event (e.g., when RF channel conditions have improved). Such techniques may improve performance of the UE 115-a configured with multiple BWPs and operating in an MSIM mode and may enable autonomous BWP switching in abrupt shadowing and tune-away gap scenarios despite missing a command from the network entity 105-a.

The UE 115-a may receive a configuration message 210 from the network entity 105-a. The configuration message 210 may indicate a set of BWPs and a first BWP 215 that is active for scheduling wireless communication between the UE 115-a and the network entity 105-a. That is, the network entity 105-a may configure the UE 115-a with a set of BWPs, where one BWP of the set of BWPs is active for the UE 115-a. For example, the configuration message 210 may indicate the set of BWPs including a BWP #0, a BWP #1, a BWP #2, and a BWP #3, where the BWP #1 (e.g., the first BWP 215) is active. The DDS may be in a connected state when the first BWP 215 is active. While the UE 115-*a* operates on the first BWP 215, the DDS may be in an active data call receiving some active downlink date (e.g., with a 50% or other percentage scheduling rate) and actively decoding the PDCCH and corresponding DCI (e.g., for DCI_1_1, DCI_0_1, or both). Because the first BWP 215 is active, the UE 115-*a* may refrain from using the BWP #0, the BWP #2, or the BWP #3.

The UE 115-*a* may receive some downlink messages (e.g., PDCCH and DCI) from the network entity 105-*a* while operating on the first BWP 215. In some examples, the network entity 105-*a* may transmit DCI indicating that the UE 115-*a* is to switch from the first BWP 215 to a second BWP (e.g., a BWP #0, a BWP #2, or a BWP #3). In doing so, the network entity 105-*a* may deactivate the first BWP 215 and activate the second BWP. The UE 115-*a* may switch to the second BWP and, as the second BWP is now active, may monitor the second BWP for future transmissions from the network entity 105-*a*.

In some implementations, the UE 115-*a* may experience an event 220 that may impact the ability of the UE 115-*a* to decode DCI from the network entity 105-*a*. For example, the UE 115-*a* may detect an event 220 such as an abrupt shadowing event or a long tune-away gap associated with the first BWP 215. In some examples, the UE 115-*a* may experience a PDCCH block error rate (BLER) that prevents the UE 115-*a* from receiving DCI from the network entity 105-*a*.

In response to the UE 115-*a* detecting such an event 220, the UE 115-*a* may determine that a scheduling rate associated with the first BWP fails to satisfy a scheduling threshold. For example, the UE 115-*a* may determine that there is a significant decline in signal-to-noise ratio (SNR), reference signal received power (RSRP), energy, or some other metric, which may cause the scheduling rate of the channel to decrease. The scheduling rate may be a measure of signaling throughput or how many transmissions the network entity 105-*a* is able to schedule on the channel, for the UE 115-*a*, for other wireless devices, or both. The scheduling threshold may be based on a scheduling rate prior to the event 220 or may be preconfigured. For example, the network entity 105-*a* entity may configure and indicate the scheduling threshold to the UE 115-*a*, or the scheduling threshold may be stored in memory at the UE 115-*a*. As used herein, "satisfying a threshold" may, depending on the context, refer to a value being greater than the threshold, greater than or equal to the threshold, less than the threshold, less than or equal to the threshold, equal to the threshold, not equal to the threshold, or the like.

During the event 220, the network entity 105-*a* may transmit a command for the UE 115-*a* to switch from the first BWP 225 to a second BWP (e.g., the BWP #0, the BWP #2, or the BWP #3). In some examples, the network entity 105-*a* may indicate to switch from a first BWP identifier (ID) to a second BWP ID (e.g., from ID #1 to ID #2). Also during the event 220, the UE 115-*a* may identify that it is no longer receiving PDCCH transmissions (including DCI) from the network entity 105-*a*. That is, because of the decline in scheduling rate (e.g., a drop in throughput), the UE 115-*a* may be unable to receive transmissions including PDCCH and DCI from the network entity 105-*a* during the event 220. Because the UE 115-*a* lacks knowledge of any DCI the network entity 105-*a* may have transmitted during the event 220, the UE 115-*a* may be unaware of any BWP switch commands included in the DCI.

Determining that the scheduling rate has fallen below the scheduling threshold may indicate to the UE 115-*a* that the UE 115-*a* is to check the other BWPs originally configured for the UE 115-*a* to determine whether the UE 115-*a* is being scheduled on a different BWP and thus, that the UE 115-*a* missed a BWP switch indication. That is, the UE 115-*a* may determine that it is to attempt to decode a reference signal on other configured BWPs in an effort to detect a BWP switch command. In this way, after resuming activities after the tune-away gap or after recovering from the shadowing event, and if the UE 115-*a* is not receiving DCI on the PDCCH on the first BWP 225, the UE 115-*a* may perform a reference signal decode attempt on the other BWPs configured for the UE 115-*a*. For example, based on determining that the scheduling rate has declined, the UE 115-*a* may decode a reference signal on a second BWP of the set of BWPs configured for the UE 115-*a* to determine that the second BWP is active (e.g., that is, that the network entity 105-*a* transmitted DCI indicating a BWP switch from the first BWP 225 to the second BWP). The second BWP may be a BWP 230 (e.g., BWP #0), a BWP 235 (e.g., BWP #2), or a BWP 240 (e.g., BWP #3).

Based on successfully decoding the reference signal on the second BWP (e.g., based on the second BWP being activated by the network entity 105-*a* and thus used for downlink activities), the UE 115-*a* may determine that a BWP switch has occurred from the first BWP 225 to the second BWP. In some examples, the UE 115-*a* may determine that the BWP switch has occurred based on detecting a high energy or SNR value on the second BWP. The UE 115-*a* may monitor the second BWP for a scheduling message from the network entity 105-*a* based on determining that the BWP switch has occurred. The UE 115-*a* may continue to use the target BWP (e.g., the second BWP, the BWP ID #2) after the BWP switch to communicate with the network entity 105-*a*.

In some examples, the UE 115-*a* may decode a TRS on the second BWP. A TRS may be a particular form of non-zero-power CSI-RS, and a bandwidth of a CSI-RS resource (for a CSI-RS or a TRS) may be given by a higher layer parameter freqBand configured in the information element CSI-RS-ResourceMapping, and may be the minimum of 52 resource blocks or some quantity of resource blocks based on a BWP size. In some implementations, the UE 115-*a* may receive a TRS from the network entity 105-*a* on the second BWP, where the network entity 105-*a* may configure (e.g., via RRC signaling) the TRS for the set of BWPs (including the BWP 230, the BWP 235, and the BWP 240) initially configured for the UE 115-*a*. That is, the TRS may be present or configured for each of the configured BWPs, and the network entity 105-*a* may transmit the TRS, if configured, on an active BWP upon that BWP becoming active. The UE 115-*a* may then decode the TRS on the second BWP to determine that the second BWP is active, and that the first BWP is no longer the active BWP.

The UE 115-*a* may wait some threshold period of time before performing a TRS decode attempt on other BWPs after determining that the tune-away gap or the shadowing event has occurred. That is, the UE 115-*a* may refrain from attempting to decode the TRSs on the other BWPs too early, as this may waste power. Instead, the UE 115-*a* may utilize some time period to determine whether it is still being scheduled on the first BWP 225 after the event 220. During this time period, the UE 115-*a* may monitor the first BWP 225 to determine if it is still being scheduled on the first BWP 225 (e.g., still receiving downlink transmissions). If the UE 115-*a* does not receive downlink transmissions, control messages scheduling the UE 115-*a*, or the like, during the time period (indicating that the UE 115-*a* is no longer being scheduled on first BWP 225), then the UE 115-*a* may begin monitoring for TRSs on the other BWPs. In some examples, the period of time may be based on a quantity of slots that may be defined based on past DCI decoding history and the scheduling rate (e.g., a percentage indicating the quantity of the scheduling rate). In this way, the time period may span a quantity of slots based on the scheduling rate and some prior DCI. For example, if the UE 115-*a* attempts and fails to decode the reference signal on the first BWP 225 (e.g., the BWP #1), the UE 115-*a* may wait the time period or the quantity of slots before attempting to decode the reference signal on the BWP 235 (e.g., the BWP #2) or the BWP 240 (e.g., the BWP #3). In some implementations, the UE 115-*a* may initiate an inactivity timer (e.g., a bandwidth inactivity timer, bwp-Inactivity Timer) associated with the first BWP 215 (while the first BWP 215 is active). Upon expiration of the inactivity timer, the UE 115-*a* may switch to a second BWP as configured by the network entity 105-*a*. If the inactivity timer expires during the event 220 (e.g., the tune-away gap or the shadowing event), the UE 115-*a* may be unable to decode any downlink grants it may have received before the timer expired. Before switching from the first BWP 225 to the second BWP (e.g., to the initialDownlinkBWP or the defaultDownlinkBWP-Id), the UE 115-*a* may attempt to decode a TRS on the first BWP 225 to ensure that the inactivity timer has not been restarted at the network entity 105-*a*. That is, the UE 115-*a* may attempt to decode the reference signal on the first BWP 225 in response to expiration of the inactivity timer and because of the declined scheduling rate it detected during the event 220. Alternatively, if the UE 115-*a* does not detect a TRS on the first BWP 215 but does detect a TRS on the second BWP, the UE 115-*a* may determine that it missed the BWP switch indication for switching from the first BWP 225 to the second BWP. Accordingly, the UE 115-*a* may attempt to decode a TRS on the second BWP (e.g., the BWP 230, the BWP 235, the BWP 240) as described herein.

Figure 3:
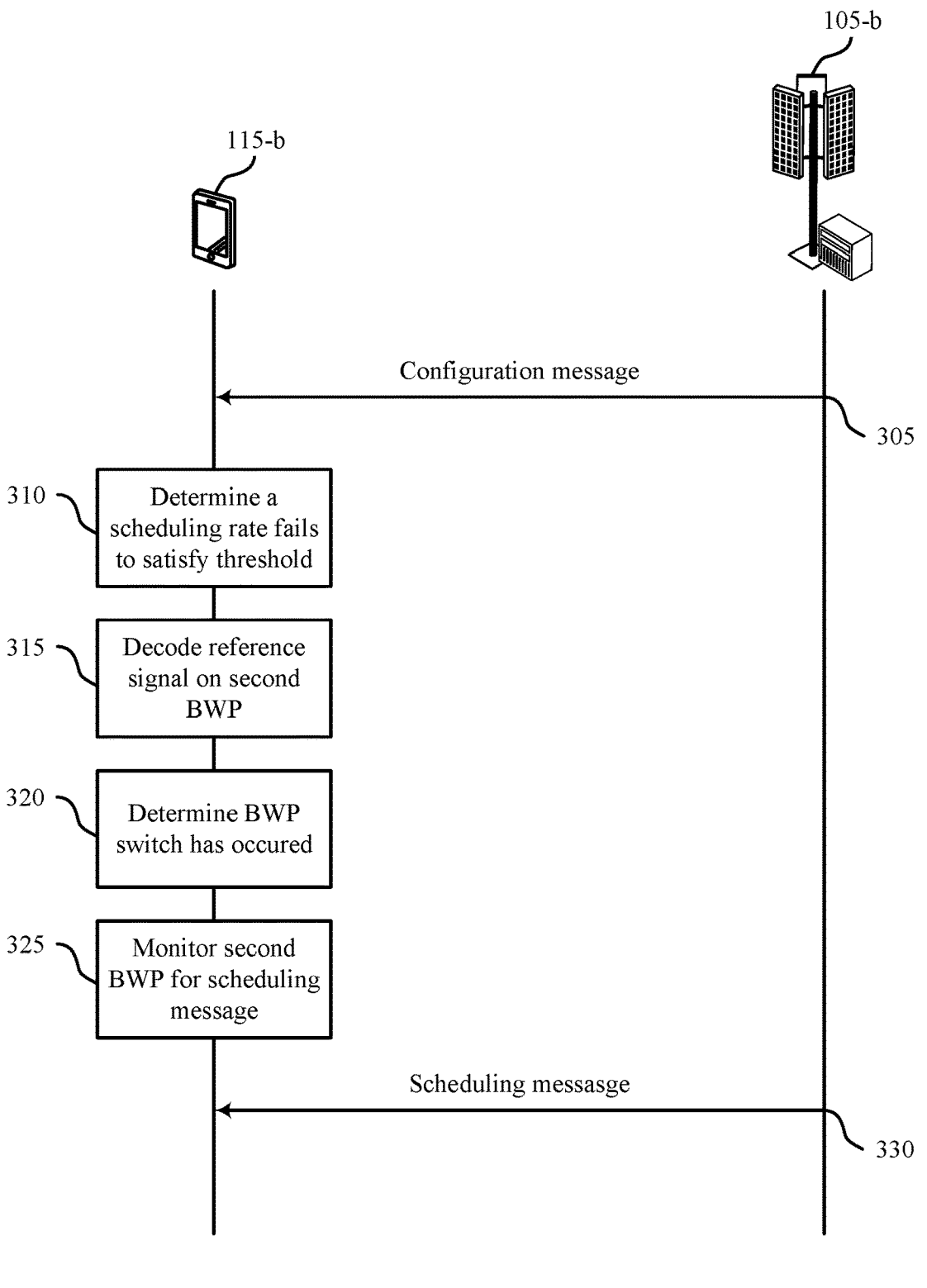
FIG. 3 shows an example of a process flow that supports BWP switching based on reference signal decoding in accordance with one or more aspects of the present disclosure.

FIG. 3 shows an example of a process flow 300 that supports BWP switching based on reference signal decoding in accordance with one or more aspects of the present disclosure. The process flow 300 may implement aspects of wireless communications systems 100 and 200, or may be implemented by aspects of the wireless communications system 100 and 200. For example, the process flow 300 may illustrate operations between a UE 115-*b* and a network entity 105-*b*, which may be examples of corresponding devices described herein. In the following description of the process flow 300, the operations between the UE 115-*b* and the network entity 105-*b* may be transmitted in a different order than the example order shown, or the operations performed by the UE 115-*b* and the network entity 105-*b* may be performed in different orders or at different times. Some operations may also be omitted from the process flow 300, and other operations may be added to the process flow 300.

At 305, the UE 115-*b* may receive, from the network entity 105-*b*, a configuration message that indicates a set of multiple BWPs and a first BWPs of the set of BWPs is active for scheduling wireless communication between the UE 115-*b* and the network entity 105-*b*. While the first BWP is active, a DDS associated with the UE 115-*b* may be in a connected mode.

At 310, the UE 115-*b* may determine that a scheduling rate associated with the first BWP fails to satisfy a scheduling threshold subsequent to detection of a shadowing event associated with the first BWP or subsequent to a tune-away gap associated with the first BWP. That is, the UE 115-*a* may detect an abrupt drop in SNR, RSRP, or some other value indicating a shadowing event or a tune-away gap which may result in a drop in scheduling rate or decrease in RF channel conditions. In the case of a tune-away gap, a non-DDS associated with the UE 115-*b* may be in a connected mode.

At 315, the UE 115-*b* may decode a reference signal (e.g., a TRS) on a second BWP of the set of multiple BWPs to determine that the second BWP is active based on the scheduling rate associated with the first BWP failing to satisfy the scheduling threshold. That is, during the shadowing event or the tune-away gap, the UE 115-*b* may fail to receive any DCI transmitted by the network entity 105-*b* which may include a BWP switch command. As such, to detect whether there was a BWP switch command at all, the UE 115-*b* may attempt to decode the reference signal on other BWPs.

At 320, the UE 115-*b* may determine that a bandwidth switch has occurred from the first BWP to the second BWP based on decoding the reference signal on the second BWP. That is, if the UE 115-*b* successfully decodes the reference signal on the second BWP, then the network entity 105-*a* would have indicated the switch from the first BWP to the second BWP and activated the second BWP.

At 325, the UE 115-*b* may monitor the second BWP for a scheduling message based on decoding the reference signal on the BWP. At 330, the UE 115-*b* may receive, from the network entity 105-*b*, the second BWP, the scheduling message. The scheduling message may facilitate subsequent communications between the UE 115-*b* and the network entity 105-*b*.

Figure 4:
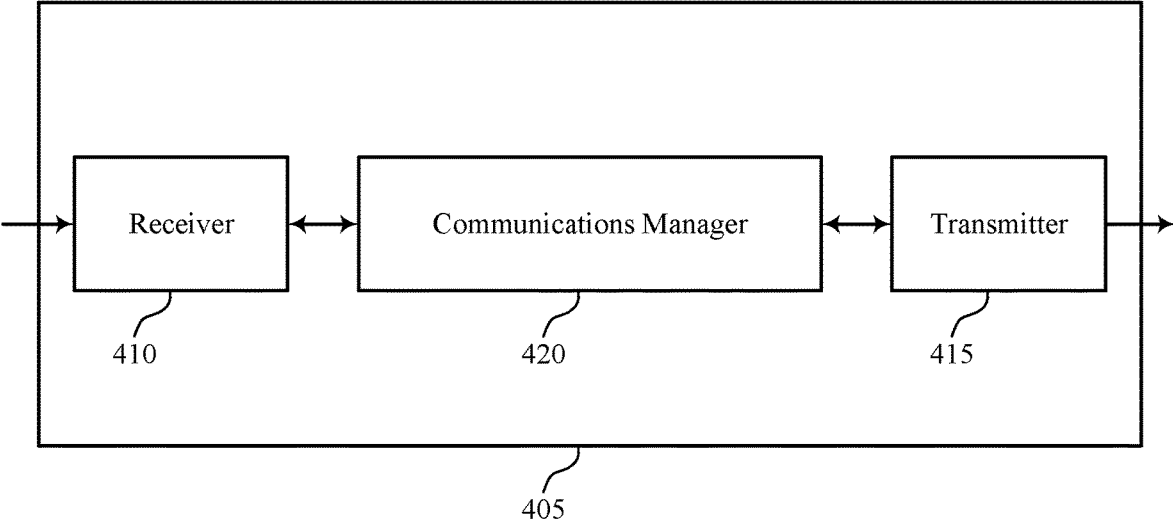
FIGS. 4 and 5 show block diagrams of devices that support BWP switching based on reference signal decoding in accordance with one or more aspects of the present disclosure.

FIG. 4 shows a block diagram 400 of a device 405 that supports BWP switching based on reference signal decoding in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to BWP switching based on reference signal decoding). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to BWP switching based on reference signal decoding). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of BWP switching based on reference signal decoding as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for receiving, from a network entity, a configuration message that indicates a set of multiple BWPs and a first BWP of the set of multiple BWPs is active for scheduling wireless communication between the UE and the network entity. The communications manager 420 is capable of, configured to, or operable to support a means for determining that a scheduling rate associated with the first BWP fails to satisfy a scheduling threshold subsequent to detection of a shadowing event associated with the first BWP or subsequent to a tune-away gap associated with the first BWP. The communications manager 420 is capable of, configured to, or operable to support a means for decoding a reference signal on a second BWP of the set of multiple BWPs to determine that the second BWP is active based on the scheduling rate associated with the first BWP failing to satisfy the scheduling threshold. The communications manager 420 is capable of, configured to, or operable to support a means for monitoring the second BWP for a scheduling message based on decoding the reference signal on the second BWP.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for BWP switching based on decoding reference signals, which may improve communication quality, increase signaling throughput, decrease latency, and improve power consumption.

Figure 5:
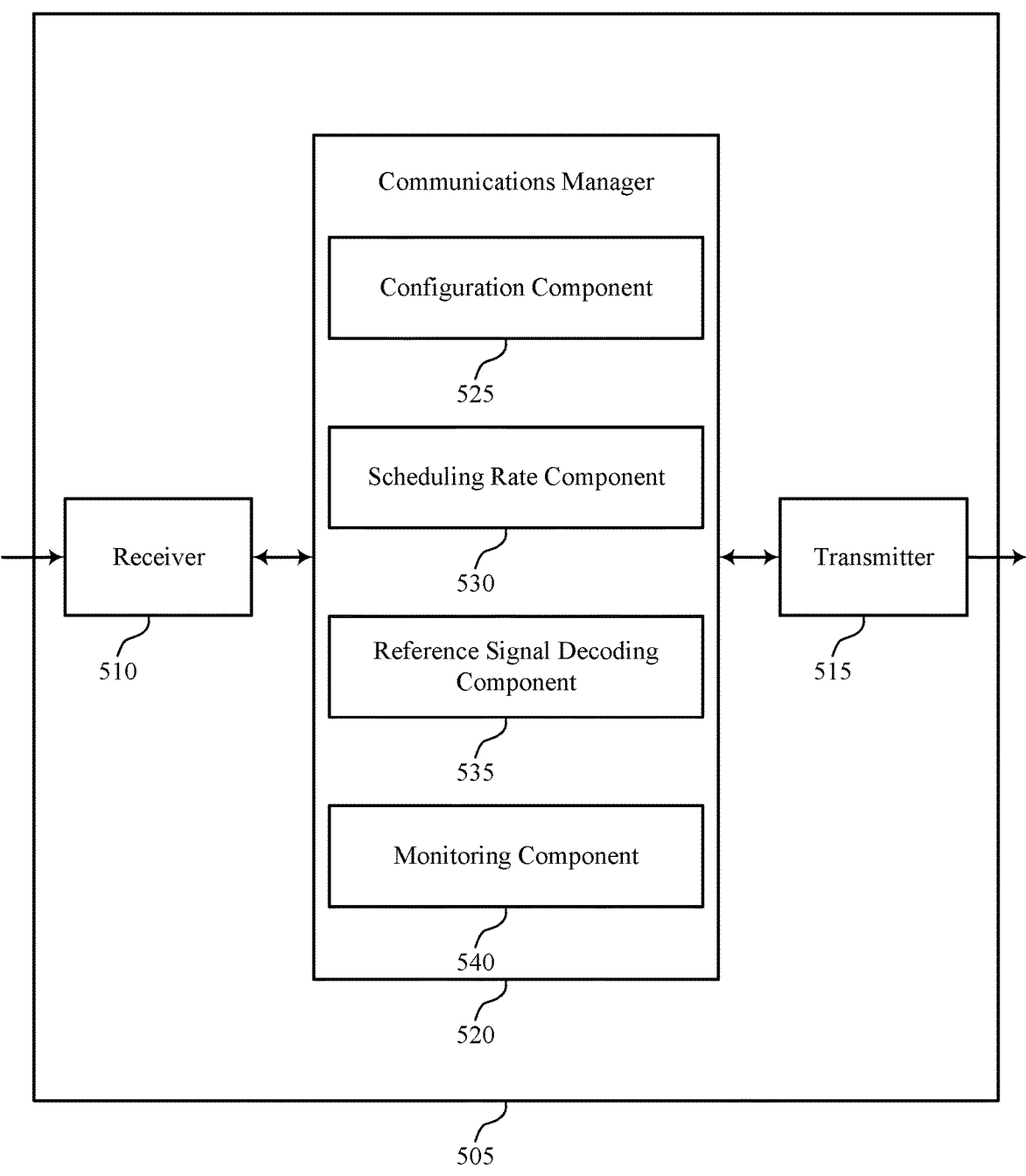

FIG. 5 shows a block diagram 500 of a device 505 that supports BWP switching based on reference signal decoding in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to BWP switching based on reference signal decoding). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to BWP switching based on reference signal decoding). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of BWP switching based on reference signal decoding as described herein. For example, the communications manager 520 may include a configuration component 525, a scheduling rate component 530, a reference signal decoding component 535, a monitoring component 540, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The configuration component 525 is capable of, configured to, or operable to support a means for receiving, from a network entity, a configuration message that indicates a set of multiple BWPs and a first BWP of the set of multiple BWPs is active for scheduling wireless communication between the UE and the network entity. The scheduling rate component 530 is capable of, configured to, or operable to support a means for determining that a scheduling rate associated with the first BWP fails to satisfy a scheduling threshold subsequent to detection of a shadowing event associated with the first BWP or subsequent to a tune-away gap associated with the first BWP. The reference signal decoding component 535 is capable of, configured to, or operable to support a means for decoding a reference signal on a second BWP of the set of multiple BWPs to determine that the second BWP is active based on the scheduling rate associated with the first BWP failing to satisfy the scheduling threshold. The monitoring component 540 is capable of, configured to, or operable to support a means for monitoring the second BWP for a scheduling message based on decoding the reference signal on the second BWP.

Figure 6:
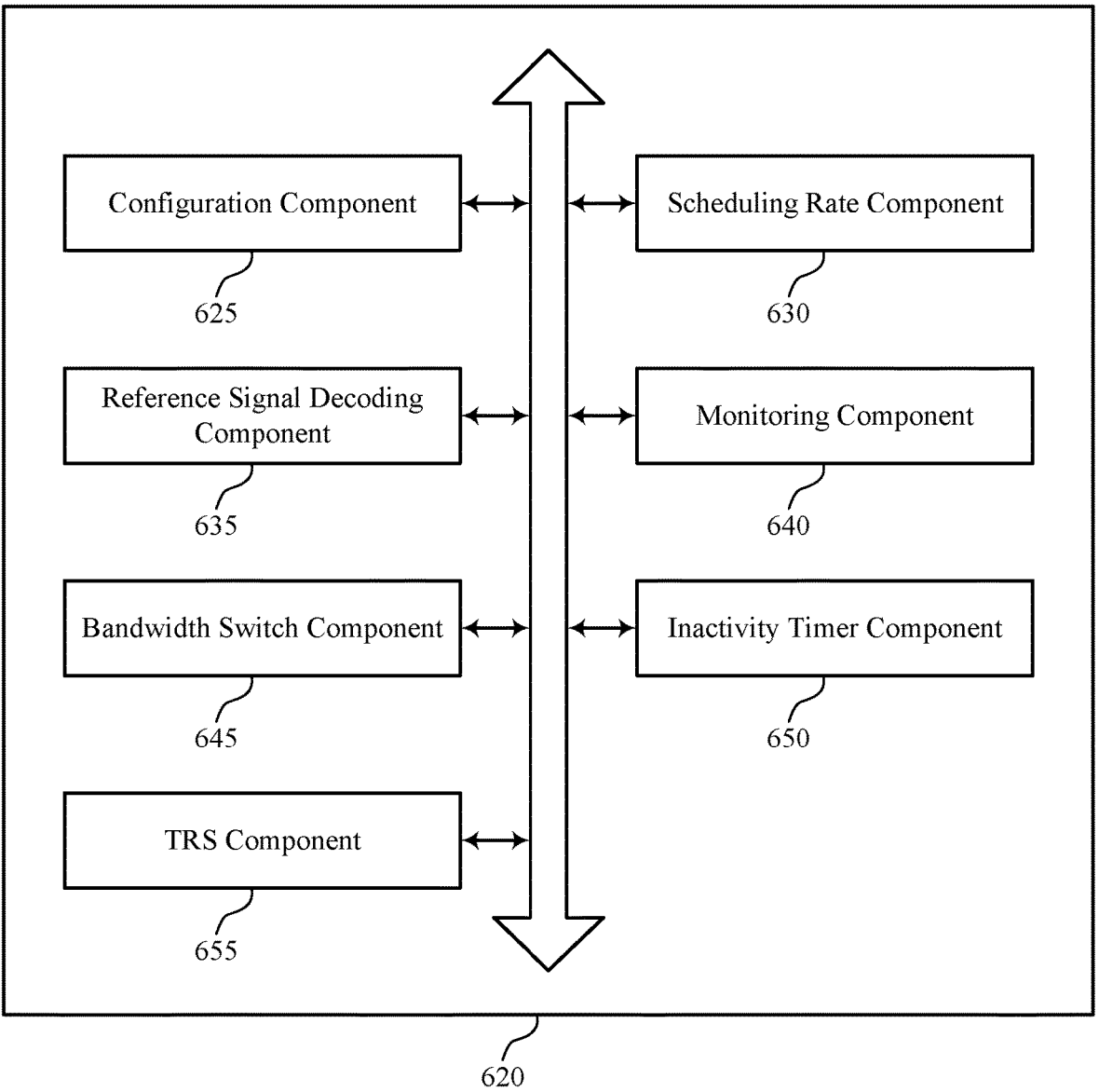
FIG. 6 shows a block diagram of a communications manager that supports BWP switching based on reference signal decoding in accordance with one or more aspects of the present disclosure.

FIG. 6 shows a block diagram 600 of a communications manager 620 that supports BWP switching based on reference signal decoding in accordance with one or more aspects of the present disclosure. The communications manager 620 may be an example of aspects of a communications manager 420, a communications manager 520, or both, as described herein. The communications manager 620, or various components thereof, may be an example of means for performing various aspects of BWP switching based on reference signal decoding as described herein. For example, the communications manager 620 may include a configuration component 625, a scheduling rate component 630, a reference signal decoding component 635, a monitoring component 640, a bandwidth switch component 645, an inactivity timer component 650, an TRS component 655, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The configuration component 625 is capable of, configured to, or operable to support a means for receiving, from a network entity, a configuration message that indicates a set of multiple BWPs and a first BWP of the set of multiple BWPs is active for scheduling wireless communication between the UE and the network entity. The scheduling rate component 630 is capable of, configured to, or operable to support a means for determining that a scheduling rate associated with the first BWP fails to satisfy a scheduling threshold subsequent to detection of a shadowing event associated with the first BWP or subsequent to a tune-away gap associated with the first BWP. The reference signal decoding component 635 is capable of, configured to, or operable to support a means for decoding a reference signal on a second BWP of the set of multiple BWPs to determine that the second BWP is active based on the scheduling rate associated with the first BWP failing to satisfy the scheduling threshold. The monitoring component 640 is capable of, configured to, or operable to support a means for monitoring the second BWP for a scheduling message based on decoding the reference signal on the second BWP.

In some examples, the bandwidth switch component 645 is capable of, configured to, or operable to support a means for determining that a bandwidth switch has occurred from the first BWP to the second BWP based on decoding the reference signal on the second BWP, where monitoring the second BWP for the scheduling message is based on the bandwidth switch.

In some examples, the bandwidth switch component 645 is capable of, configured to, or operable to support a means for monitoring for a control message indicating to switch from the first BWP to the second BWP during the shadowing event or the tune-away gap.

In some examples, the inactivity timer component 650 is capable of, configured to, or operable to support a means for initiating a bandwidth inactivity timer associated with the first BWP that is active for scheduling the wireless communication between the UE and the network entity. In some examples, the inactivity timer component 650 is capable of, configured to, or operable to support a means for decoding the reference signal on the first BWP of the set of multiple BWPs in response to expiration of the bandwidth inactivity timer and based on the scheduling rate associated with the first BWP failing to satisfy the scheduling threshold.

In some examples, to support decoding the reference signal on the second BWP, the reference signal decoding component 635 is capable of, configured to, or operable to support a means for determining a quantity of slots after the detection of the shadowing event or the tune-away gap based on the scheduling rate and prior downlink control information. In some examples, to support decoding the reference signal on the second BWP, the reference signal decoding component 635 is capable of, configured to, or operable to support a means for decoding the reference signal on the second BWP after the quantity of slots.

In some examples, to support decoding the reference signal, the TRS component 655 is capable of, configured to, or operable to support a means for receiving, from the network entity, a TRS on the second BWP, where the TRS is configured for the set of multiple BWPs. In some examples, to support decoding the reference signal, the reference signal decoding component 635 is capable of, configured to, or operable to support a means for decoding the TRS on the second BWP to determine that the second BWP is active. In some examples, the UE supports MSIM operation. In some examples, a DDS is in a connected state when the first BWP is active.

Figure 7:
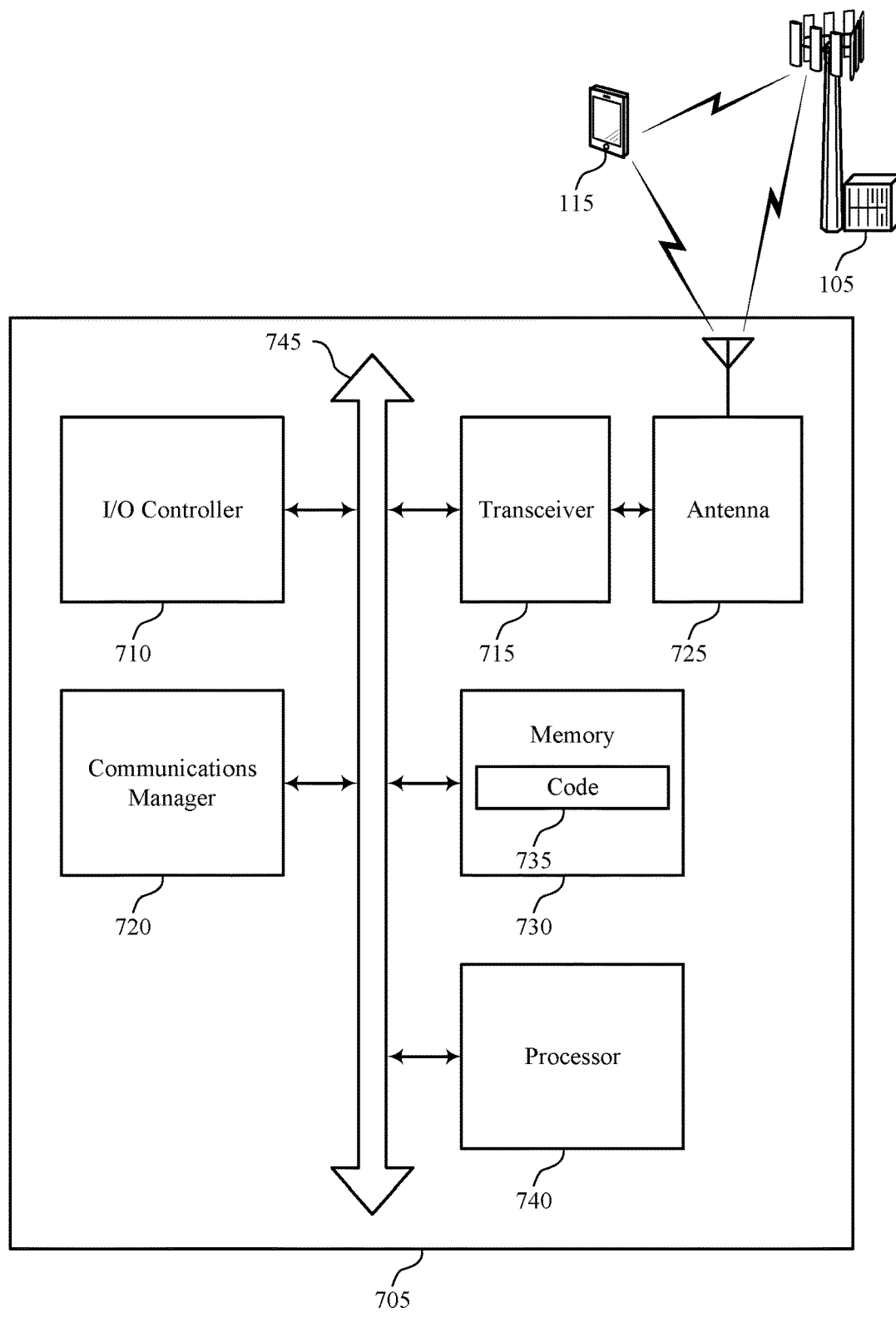
FIG. 7 shows a diagram of a system including a device that supports BWP switching based on reference signal decoding in accordance with one or more aspects of the present disclosure.

FIG. 7 shows a diagram of a system 700 including a device 705 that supports BWP switching based on reference signal decoding in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the trans-ceiver 715 may represent a wireless transceiver and may communicate bi-directionally with another wireless trans-ceiver. The transceiver 715 may also include a modem to modulate the packets, to provide the modulated packets to one or more antennas 725 for transmission, and to demodu-late packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a program-mable logic device, a discrete gate or transistor logic com-ponent, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting BWP switching based on reference signal decoding). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be con-figured to perform various functions herein. In some examples, the at least one processor 740 may be a compo-nent of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configur-able to, or operable to cause the device 705 to perform one or more of the functions described herein. Further, as described herein, being "configured to," being "configurable to," and being "operable to" may be used interchangeably and may be associated with a capability, when executing code stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for receiving, from a network entity, a configuration message that indicates a set of multiple BWPs and a first BWP of the set of multiple BWPs is active for scheduling wireless communication between the UE and the network entity. The communications manager 720 is capable of, configured to, or operable to support a means for determining that a scheduling rate associated with the first BWP fails to satisfy a scheduling threshold subsequent to detection of a shad-owing event associated with the first BWP or subsequent to a tune-away gap associated with the first BWP. The com-munications manager 720 is capable of, configured to, or operable to support a means for decoding a reference signal on a second BWP of the set of multiple BWPs to determine that the second BWP is active based on the scheduling rate associated with the first BWP failing to satisfy the sched-uling threshold. The communications manager 720 is capable of, configured to, or operable to support a means for monitoring the second BWP for a scheduling message based on decoding the reference signal on the second BWP.

By including or configuring the communications manager 720 in accordance with examples as described herein, the device 705 may support techniques for BWP switching based on decoding reference signals, which may improve communication quality, increase signaling throughput, decrease latency, and improve power consumption.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of BWP switching based on refer-ence signal decoding as described herein, or the at least one processor 740 and the at least one memory 730 may be otherwise configured to, individually or collectively, perform or support such operations.

FIG. 8 shows a flowchart illustrating a method 800 that supports BWP switching based on reference signal decoding in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include receiving, from a network entity, a configuration message that indicates a set of multiple BWPs and a first BWP of the set of multiple BWPs is active for scheduling wireless communication between the UE and the network entity. The operations of block 805 may be performed in accordance with examples as disclosed herein. In some examples, aspects of the operations of 805 may be performed by a configuration component 625 as described with reference to FIG. 6.

At 810, the method may include determining that a scheduling rate associated with the first BWP fails to satisfy a scheduling threshold subsequent to detection of a shadowing event associated with the first BWP or subsequent to a tune-away gap associated with the first BWP. The operations of block 810 may be performed in accordance with examples as disclosed herein. In some examples, aspects of the operations of 810 may be performed by a scheduling rate component 630 as described with reference to FIG. 6.

At 815, the method may include decoding a reference signal on a second BWP of the set of multiple BWPs to determine that the second BWP is active based on the scheduling rate associated with the first BWP failing to satisfy the scheduling threshold. The operations of block 815 may be performed in accordance with examples as disclosed herein. In some examples, aspects of the operations of 815 may be performed by a reference signal decoding component 635 as described with reference to FIG. 6.

At 820, the method may include monitoring the second BWP for a scheduling message based on decoding the reference signal on the second BWP. The operations of block 820 may be performed in accordance with examples as disclosed herein. In some examples, aspects of the operations of 820 may be performed by a monitoring component 640 as described with reference to FIG. 6.

FIG. 9 shows a flowchart illustrating a method 900 that supports BWP switching based on reference signal decoding in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include receiving, from a network entity, a configuration message that indicates a set of multiple BWPs and a first BWP of the set of multiple BWPs is active for scheduling wireless communication between the UE and the network entity. The operations of block 905 may be performed in accordance with examples as disclosed herein. In some examples, aspects of the operations of 905 may be performed by a configuration component 625 as described with reference to FIG. 6.

At 910, the method may include determining that a scheduling rate associated with the first BWP fails to satisfy a scheduling threshold subsequent to detection of a shadowing event associated with the first BWP or subsequent to a tune-away gap associated with the first BWP. The operations of block 910 may be performed in accordance with examples as disclosed herein. In some examples, aspects of the operations of 910 may be performed by a scheduling rate component 630 as described with reference to FIG. 6.

At 915, the method may include decoding a reference signal on a second BWP of the set of multiple BWPs to determine that the second BWP is active based on the scheduling rate associated with the first BWP failing to satisfy the scheduling threshold. The operations of block 915 may be performed in accordance with examples as disclosed herein. In some examples, aspects of the operations of 915 may be performed by a reference signal decoding component 635 as described with reference to FIG. 6.

At 920, the method may include determining that a bandwidth switch has occurred from the first BWP to the second BWP based on decoding the reference signal on the second BWP. The operations of block 920 may be performed in accordance with examples as disclosed herein. In some examples, aspects of the operations of 920 may be performed by a bandwidth switch component 645 as described with reference to FIG. 6.

At 925, the method may include monitoring the second BWP for a scheduling message based on the bandwidth switch. The operations of block 925 may be performed in accordance with examples as disclosed herein. In some examples, aspects of the operations of 925 may be performed by a monitoring component 640 as described with reference to FIG. 6.

FIG. 10 shows a flowchart illustrating a method 1000 that supports BWP switching based on reference signal decoding in accordance with aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1005, the method may include receiving, from a network entity, a configuration message that indicates a set of multiple BWPs and a first BWP of the set of multiple BWPs is active for scheduling wireless communication between the UE and the network entity. The operations of block 1005 may be performed in accordance with examples as disclosed herein. In some examples, aspects of the operations of 1005 may be performed by a configuration component 625 as described with reference to FIG. 6.

At 1010, the method may include determining that a scheduling rate associated with the first BWP fails to satisfy a scheduling threshold subsequent to detection of a shadowing event associated with the first BWP or subsequent to a tune-away gap associated with the first BWP. The operations of block 1010 may be performed in accordance with examples as disclosed herein. In some examples, aspects of the operations of 1010 may be performed by a scheduling rate component 630 as described with reference to FIG. 6.

At 1015, the method may include initiating a bandwidth inactivity timer associated with the first BWP. The operations of block 1015 may be performed in accordance with examples as disclosed herein. In some examples, aspects of the operations of 1015 may be performed by an inactivity timer component 650 as described with reference to FIG. 6.

At 1020, the method may include decoding a reference signal on the first BWP of the set of multiple BWPs in response to expiration of the bandwidth inactivity timer and based on the scheduling rate associated with the first BWP failing to satisfy the scheduling threshold. The operations of block 1020 may be performed in accordance with examples as disclosed herein. In some examples, aspects of the operations of 1020 may be performed by an inactivity timer component 650 as described with reference to FIG. 6.

At 1025, the method may include decoding the reference signal on a second BWP of the set of multiple BWPs to determine that the second BWP is active based on the scheduling rate associated with the first BWP failing to satisfy the scheduling threshold. The operations of block 1025 may be performed in accordance with examples as disclosed herein. In some examples, aspects of the operations of 1025 may be performed by a reference signal decoding component 635 as described with reference to FIG. 6.

At 1030, the method may include monitoring the second BWP for a scheduling message based on decoding the reference signal on the second BWP. The operations of block 1030 may be performed in accordance with examples as disclosed herein. In some examples, aspects of the operations of 1030 may be performed by a monitoring component 640 as described with reference to FIG. 6.

The following provides an overview of aspects of the present disclosure:

Aspect 1: A method for wireless communications at a UE, comprising: receiving, from a network entity, a configuration message that indicates a plurality of BWPs and a first BWP of the plurality of BWPs is active for scheduling wireless communication between the UE and the network entity; determining that a scheduling rate associated with the first BWP fails to satisfy a scheduling threshold subsequent to detection of a shadowing event associated with the first BWP or subsequent to a tune-away gap associated with the first BWP; decoding a reference signal on a second BWP of the plurality of BWPs to determine that the second BWP is active based at least in part on the scheduling rate associated with the first BWP failing to satisfy the scheduling threshold; and monitoring the second BWP for a scheduling message based at least in part on decoding the reference signal on the second BWP.

Aspect 2: The method of aspect 1, further comprising: determining that a bandwidth switch has occurred from the first BWP to the second BWP based at least in part on decoding the reference signal on the second BWP, wherein monitoring the second BWP for the scheduling message is based at least in part on the bandwidth switch.

Aspect 3: The method of any of aspects 1 through 2, further comprising: monitoring for a control message indicating to switch from the first BWP to the second BWP during the shadowing event or the tune-away gap.

Aspect 4: The method of any of aspects 1 through 3, further comprising: initiating a bandwidth inactivity timer associated with the first BWP that is active for scheduling the wireless communication between the UE and the network entity; and decoding the reference signal on the first BWP of the plurality of BWPs in response to expiration of the bandwidth inactivity timer and based at least in part on the scheduling rate associated with the first BWP failing to satisfy the scheduling threshold.

Aspect 5: The method of any of aspects 1 through 4, wherein decoding the reference signal on the second BWP comprises: determining a quantity of slots after the detection of the shadowing event or the tune-away gap based at least in part on the scheduling rate and prior DCI; and decoding the reference signal on the second BWP after the quantity of slots.

Aspect 6: The method of any of aspects 1 through 5, wherein decoding the reference signal further comprises: receiving, from the network entity, a TRS on the second BWP, wherein the TRS is configured for the plurality of BWPs; and decoding the TRS on the second BWP to determine that the second BWP is active.

Aspect 7: The method of any of aspects 1 through 6, wherein the UE supports MSIM operation, and a DDS is in a connected state when the first BWP is active.

Aspect 8: A UE for wireless communications, comprising one or more memories storing processor-executable code, and one or more processors coupled with the one or more memories and individually or collectively operable to execute the code to cause the UE to perform a method of any of aspects 1 through 7.

Aspect 9: A UE for wireless communications, comprising at least one means for performing a method of any of aspects 1 through 7.

Aspect 10: A non-transitory computer-readable medium storing code for wireless communications, the code comprising instructions executable by one or more processors to perform a method of any of aspects 1 through 7.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   one or more memories storing processor-executable code; and
   one or more processors coupled with the one or more memories and individually or collectively operable to execute the code to cause the UE to:
      receive, from a network entity, a configuration message that indicates a plurality of bandwidth parts and a first bandwidth part of the plurality of bandwidth parts is active for scheduling wireless communication between the UE and the network entity;
      determine that a scheduling rate associated with the first bandwidth part fails to satisfy a scheduling threshold subsequent to detection of a shadowing event associated with the first bandwidth part or subsequent to a tune-away gap associated with the first bandwidth part;
      decode a reference signal on a second bandwidth part of the plurality of bandwidth parts to determine that the second bandwidth part is active based at least in part on the scheduling rate associated with the first bandwidth part failing to satisfy the scheduling threshold; and
      monitor the second bandwidth part for a scheduling message based at least in part on decoding the reference signal on the second bandwidth part.

2. The UE of claim 1, wherein the one or more processors are individually or collectively further operable to execute the code to cause the UE to:
   determine that a bandwidth switch has occurred from the first bandwidth part to the second bandwidth part based at least in part on decoding the reference signal on the second bandwidth part, wherein monitoring the second bandwidth part for the scheduling message is based at least in part on the bandwidth switch.

3. The UE of claim 1, wherein the one or more processors are individually or collectively further operable to execute the code to cause the UE to:
   monitor for a control message indicating to switch from the first bandwidth part to the second bandwidth part during the shadowing event or the tune-away gap.

4. The UE of claim 1, wherein the one or more processors are individually or collectively further operable to execute the code to cause the UE to:
   initiate a bandwidth inactivity timer associated with the first bandwidth part that is active for scheduling the wireless communication between the UE and the network entity; and
   decode the reference signal on the first bandwidth part of the plurality of bandwidth parts in response to expiration of the bandwidth inactivity timer and based at least in part on the scheduling rate associated with the first bandwidth part failing to satisfy the scheduling threshold.

5. The UE of claim 1, wherein, to decode the reference signal on the second bandwidth part, the one or more processors are individually or collectively operable to execute the code to cause the UE to:

determine a quantity of slots after the detection of the shadowing event or the tune-away gap based at least in part on the scheduling rate and prior downlink control information; and
   decode the reference signal on the second bandwidth part after the quantity of slots.

6. The UE of claim 1, wherein, to decode the reference signal, the one or more processors are individually or collectively further operable to execute the code to cause the UE to:
   receive, from the network entity, a tracking reference signal on the second bandwidth part, wherein the tracking reference signal is configured for the plurality of bandwidth parts; and
   decode the tracking reference signal on the second bandwidth part to determine that the second bandwidth part is active.

7. The UE of claim 1, wherein:
   the UE supports multiple subscriber identity module (MSIM) operation, and
   a dedicated data subscription is in a connected state when the first bandwidth part is active.

8. A method for wireless communications at a user equipment (UE), comprising:
   receiving, from a network entity, a configuration message that indicates a plurality of bandwidth parts and a first bandwidth part of the plurality of bandwidth parts is active for scheduling wireless communication between the UE and the network entity;
   determining that a scheduling rate associated with the first bandwidth part fails to satisfy a scheduling threshold subsequent to detection of a shadowing event associated with the first bandwidth part or subsequent to a tune-away gap associated with the first bandwidth part;
   decoding a reference signal on a second bandwidth part of the plurality of bandwidth parts to determine that the second bandwidth part is active based at least in part on the scheduling rate associated with the first bandwidth part failing to satisfy the scheduling threshold; and
   monitoring the second bandwidth part for a scheduling message based at least in part on decoding the reference signal on the second bandwidth part.

9. The method of claim 8, further comprising:
   determining that a bandwidth switch has occurred from the first bandwidth part to the second bandwidth part based at least in part on decoding the reference signal on the second bandwidth part, wherein monitoring the second bandwidth part for the scheduling message is based at least in part on the bandwidth switch.

10. The method of claim 8, further comprising:
   monitoring for a control message indicating to switch from the first bandwidth part to the second bandwidth part during the shadowing event or the tune-away gap.

11. The method of claim 8, further comprising:
   initiating a bandwidth inactivity timer associated with the first bandwidth part that is active for scheduling the wireless communication between the UE and the network entity; and
   decoding the reference signal on the first bandwidth part of the plurality of bandwidth parts in response to expiration of the bandwidth inactivity timer and based at least in part on the scheduling rate associated with the first bandwidth part failing to satisfy the scheduling threshold.

12. The method of claim 8, wherein decoding the reference signal on the second bandwidth part comprises:

determining a quantity of slots after the detection of the shadowing event or the tune-away gap based at least in part on the scheduling rate and prior downlink control information; and decoding the reference signal on the second bandwidth part after the quantity of slots.

13. The method of claim 8, wherein decoding the reference signal further comprises:

receiving, from the network entity, a tracking reference signal on the second bandwidth part, wherein the tracking reference signal is configured for the plurality of bandwidth parts; and decoding the tracking reference signal on the second bandwidth part to determine that the second bandwidth part is active.

14. The method of claim 8, wherein the UE supports multiple subscriber identity module (MSIM) operation, and a dedicated data subscription is in a connected state when the first bandwidth part is active.

15. A non-transitory computer-readable medium storing code for wireless communications at a user equipment (UE), the code comprising instructions executable by one or more processors to:

receive, from a network entity, a configuration message that indicates a plurality of bandwidth parts and a first bandwidth part of the plurality of bandwidth parts is active for scheduling wireless communication between the UE and the network entity;

determine that a scheduling rate associated with the first bandwidth part fails to satisfy a scheduling threshold subsequent to detection of a shadowing event associated with the first bandwidth part or subsequent to a tune-away gap associated with the first bandwidth part;

decode a reference signal on a second bandwidth part of the plurality of bandwidth parts to determine that the second bandwidth part is active based at least in part on the scheduling rate associated with the first bandwidth part failing to satisfy the scheduling threshold; and monitor the second bandwidth part for a scheduling message based at least in part on decoding the reference signal on the second bandwidth part.

16. The non-transitory computer-readable medium of claim 15, wherein the instructions are further executable by the one or more processors to:

determine that a bandwidth switch has occurred from the first bandwidth part to the second bandwidth part based at least in part on decoding the reference signal on the second bandwidth part, wherein monitoring the second bandwidth part for the scheduling message is based at least in part on the bandwidth switch.

17. The non-transitory computer-readable medium of claim 15, wherein the instructions are further executable by the one or more processors to:

monitor for a control message indicating to switch from the first bandwidth part to the second bandwidth part during the shadowing event or the tune-away gap.

18. The non-transitory computer-readable medium of claim 15, wherein the instructions are further executable by the one or more processors to:

initiate a bandwidth inactivity timer associated with the first bandwidth part that is active for scheduling the wireless communication between the UE and the network entity; and decode the reference signal on the first bandwidth part of the plurality of bandwidth parts in response to expiration of the bandwidth inactivity timer and based at least in part on the scheduling rate associated with the first bandwidth part failing to satisfy the scheduling threshold.

19. The non-transitory computer-readable medium of claim 15, wherein the instructions to decode the reference signal on the second bandwidth part are executable by the one or more processors to:

determine a quantity of slots after the detection of the shadowing event or the tune-away gap based at least in part on the scheduling rate and prior downlink control information; and decode the reference signal on the second bandwidth part after the quantity of slots.

20. The non-transitory computer-readable medium of claim 15, wherein the instructions to decode the reference signal are further executable by the one or more processors to:

receive, from the network entity, a tracking reference signal on the second bandwidth part, wherein the tracking reference signal is configured for the plurality of bandwidth parts; and decode the tracking reference signal on the second bandwidth part to determine that the second bandwidth part is active.

* * * * *